United States Patent Office 2,810,206
Patented Oct. 22, 1957

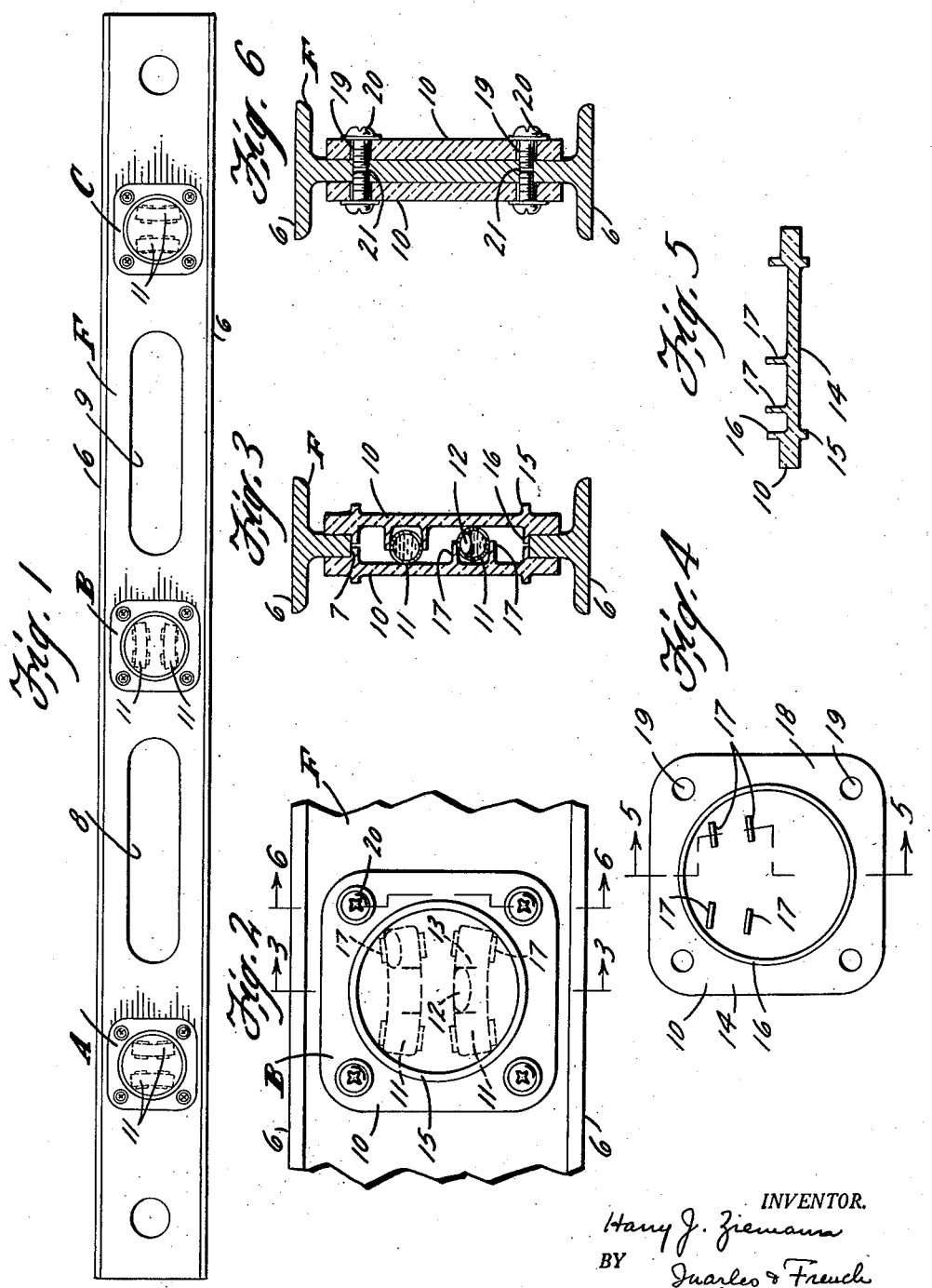

2,810,206

SPIRIT LEVEL

Harry J. Ziemann, Elm Grove, Wis.

Application September 15, 1955, Serial No. 534,463

10 Claims. (Cl. 33—211)

The invention relates to levels or spirit levels.

The main object of the invention is to provide a novel form of vial holder which permits ready adjustment of the vials relative to the frame of the level while in the level.

A further object of the invention is to provide a vial holder which obviates the use of cement in the mounting of the vial in its holder or in the final positioning of the vial with relation to the frame of the level.

A further object of the invention is to provide a vial holder formed of two members, one of which carries a vial mounting and the other of which abuts the other side of the vial to hold the same, said members being of transparent material so that the position of the indicating bubble relative to the indicator lines on the vial can be readily seen.

A further object of the invention is to provide a holder for a pair of vials, each vial being carried by a member which may be readily angularly adjusted relative to the frame of the level to position the indicating bubble in the correct position relative to the testing edge of the level.

The invention further consists in the several features hereinafter set forth and more particularly defined by claims at the conclusion hereof.

In the drawings:

Fig. 1 is a side elevation view of a spirit level embodying the invention;

Fig. 2 is an enlarged view of parts shown in Fig. 1;

Fig. 3 is a detailed vertical sectional view taken on the line 3—3 of Fig. 2;

Fig. 4 is a side elevation view of one of the vial holders;

Fig. 5 is a detailed vertical sectional view taken on the broken line 5—5 of Fig. 4;

Fig. 6 is a detailed vertical sectional view taken on the line 6—6 of Fig. 2.

Referring to the drawings, the letter F designates the level frame and A, B, and C a series of indicator units, the units A and C adapted to test the trueness of vertically disposed work surfaces and the unit B adapted to test the trueness of horizontally disposed work surfaces. Each of the indicator units is of similar construction except for the disposition of the indicator vials relative to the frame so that a description of one will suffice for all.

The frame F, usually of metal, is in the form of an I-beam whose top and bottom flanges have work engaging surfaces 6 that are parallel to each other and at right angles to its ends. The web of the frame has indicator receiving openings 7, one being located in the central portion of the frame for the unit B and the others being located adjacent the ends of the frame for the units A and C. Openings 8 and 9 are provided in the frame for use as hand grips and to lighten the frame.

Each of the indicator units includes a pair of holders or transparent sight members 10, a pair of vials 11, and means for mounting said holders and vials in operative position on the web of the frame.

Each of the vials 11 is a glass tube, closed at its ends and of substantially uniform diameter throughout its length but curved slightly between its ends to form a toroidal segment so that the position of the bubble 12 formed by the liquid within the vial may be easily seen or read with reference to the true level indicator marks 13 on the vial.

Each of the holders or sight members 10 is of transparent material, preferably of a suitable transparent molded plastic such as styrene polymer or acrylic polymer or the like. Each holder is formed to provide a rectangular base portion 14 whose outer side has a reinforcing and protective annular flange 15 spaced from its outer edges and whose inner side has a reinforcing and centering annular flange 16 and spaced pairs of eccentrically disposed integrally formed transparent vial receiving projections 17 that incline at a slight angle, for example 3°, with reference to the vertical and horizontal axes of the flange 16 or the opening 7 to accommodate the curvature of the vial. The distance between the projections 17 of each pair is about equal to the diameter of the vial but is preferably somewhat less so that the ends of the vial engaging these projections may be forced into place between them, the plastic being sufficiently yieldable to permit this resilient engagement. The annular flange 16 is of a diameter to snugly fit the opening 7 so that when the holders are assembled together, dust or dirt will be substantially blocked from entrance into the space housing the vials.

The rim portion 18 of each holder has holes 19 at its corners large enough to loosely receive clamping screws 20 that are mounted in threaded holes 21 in the web of the frame F, said rim providing attaching portions to receive said screws. The holes 21 are disposed at equal distances from the centers of the holders. Each holder is the exact duplicate of the other so that when the holders are assembled in the frame, the vial holding projections of one will be spaced from the central axis of the level the same distance as the other. This central axis may be the horizontal axis as in the indicator B or the vertical axis as in the indicators A and C.

The holders are positioned with the flange 16 of each holder engaging in the opening 7, it being noted that each vial should be so placed in the projections 17 that its indicator marks 13 face inwardly and extend equally on either side of a central plane through the center lines of the vials. Since the screws are loose in the holders, each of these holders may be accurately positioned in the frame by bringing the frame into contact with a test surface and then angularly adjusting the holder until the bubble 12 comes to a true position and then tightening up the screws 20 for this holder and following the same procedure for the holder on the opposite side of the frame.

Each vial is held between its projections 17 and the surface of the opposite holder 10 so that the tightening up of the screws 20 in the rim portions 18 tightly clamps the vial of one holder between its projections 17 and the base or inner surface of the other holder and at the same time these rim portions are clamped against the web of the frame, the projections 17 being sufficiently elastic to permit of some spreading thereof during clamping of the holders to the frame. This elastic or yielding characteristic of the projections establishes a permanent retaining force acting to hold the vials permanently in position. If the projections 17 alone were relied upon to hold the vials in adjusted position, jolts or jars to which the level may be subjected in use could shift the vials out of true position, but this cannot occur in the structure of the present invention since the vials when once adjusted are firmly clamped between the projections and the surface of oppositely disposed holders.

It is to be noted that the vials have a lengthwise curvature along a medial plane dividing the side of the vial which engages the flat seat surface of a holder from the side adjacent the holder whose projections engage the vial so that unless the vials are positioned to bring the indicator marks 13 in a true reading position, the ends of the vial will not be in the same plane as the rest of the vial. Should either of the vials be angularly displaced relative to its correct plane position relative to the contacting sides of the housing, then when the holders are clamped together, the angularly offset vial will be turned to its proper position during the clamping process.

It is to be noted that the holder for one vial presents a clamping surface engaged by the vial of the other holder so that one of these holders has its vial holding projections omitted where only one vial is to be clamped in position in a level without departing from the invention.

I desire it to be understood that this invention is not to be limited to any particular form or arrangement of parts except in so far as such limitations are included in the claims.

What I claim as my invention is:

1. In a level, the combination of a frame having an opening therein and a flat work engaging surface, a pair of vials having level indicating bubbles, a pair of vial holders, each vial holder having vial gripping inwardly projecting spaced parts to receive the end portions of a vial to position it in an offset position relative to the center of said holder and within said opening and having a plane sight surface surrounded by rim portions, means for securing said rim portions to the frame adjacent said opening and permitting angular adjustment of said holder relative to said work engaging surface to bring the bubble of the vial to a correct indicating position, said holders being secured on opposite sides of said frame with a vial disposed between said spaced inwardly projecting parts of each holder and each vial being also in bearing contact with the plane sight surface of the other holder when in assembled position and being firmly clamped therebetween when the rim portions are secured to the frame.

2. In a level, the combination of a frame having an opening therein and a flat work engaging surface, a pair of tubular vials having level indicating bubbles, a pair of vial holders of transparent and yieldable material, each vial holder having spaced inwardly projecting sets of projections, said projections being spaced less than the diameters of the vials and being spread slightly to resiliently engage the sides of the vials near the ends thereof, each set of projections being offset relative to the center of its holder and positioning the vial in said opening, said holders each having a plane sight surface surrounded by an annular portion engaging in said opening and a rim portion abutting the frame adjacent said opening, radially disposed means for clamping said rim portions to the frame in an angularly disposed position in which the bubbles of the vials are in correct indicating position and the vials bear aganist the projections retaining the same by one vial holder and the plane sight surface of the other vial holder.

3. In a level, the combination of a frame having an opening therein and a flat work engaging surface, a pair of vials having level indicating bubbles and indicator marks for the correct position of the bubbles, each of the vials having a tube that is curved between its ends to locate the bubble between the indicator marks when the vial is in its true reading position, a pair of vial holders, each vial holder having spaced sets of projections of less height than the diameter of the vials and receiving the vial between them to position the vial in said opening and having a plane sight surface adjacent and extending beyond the position occupied by the vial, each vial when positioned in its holder projecting a uniform distance throughout its length from its holder when the indicator marks are in their correct position and contacting and bearing against the portion of the sight surface of the other holder which extends beyond the position occupied by its retained vial, and means for clamping the holders to the frame and the vials between said holders, the clamping action of the holders acting on the vials to retain them in their correct leveling position and to restrain turning of the vials about their own axis.

4. In a level, the combination of a frame having an opening therein and a flat work engaging surface, a vial having a level indicating bubble, a vial holder having spaced parts to receive the end portions of the vial to position it within said opening and having attaching portions, means for securing said attaching portions to the frame adjacent one side of said opening and permitting angular adjustment of said holder relative to said work engaging surface to bring the bubble of the vial to a correct indicating position, and a transparent holder member secured to the other side of said frame and directly engageable with the other side of said vial to clamp the vial between it and its vial holder when in assembled position.

5. In a level, the combination of a frame having an opening therein and a flat work engaging surface, a pair of vials having level indicating bubbles, a pair of vial holders, each vial holder having parts to receive and hold the end portions of a vial to position it in an offset position relative to the center of said holder and within said opening and having attaching portions, the parts of the said holders receiving the vial being transparent, means for securing said attaching portions to the frame adjacent said opening and permitting angular adjustment of each holder relative to said work engaging surface to bring the bubble of the vial to a correct indicating position, said holders being secured on opposite sides of said frame and each cooperating with the other to directly clamp the vials therebetween in their indicating positions.

6. In a level, the combination of a frame having a longitudinally extending work engaging plane surface, a spirit level vial enclosing a liquid and an indicating bubble and having a curved inner wall arched along a line in a longitudinal medial plane to provide a crest occupied by the bubble when the vial is in horizontal indicating position, said vial having sides presenting contact points extending parallel to said medial plane; a first transparent sight member having a plane inner seat surface in contact with the contact points of one of the sides of said vial; means for securing said first sight member to said frame with the seat surface thereof at right angles to said work engaging surface of the frame; a second transparent sight member spaced from the first secured to the frame and having vial orienting resilient means secured thereto engaging the vial to retain the same in horizontal indicating relation to the work engaging surface and to apply a force to the vial in the direction of the first sight member to establish an alignment preserving bearing contact force between the first sight member and the contact points on said first named side of the vial; and means for securing said second sight member to the frame in level indicating orientation with resepct thereto.

7. A level in accordance with claim 6 wherein the vial is in the form of a toroidal segment.

8. A level in accordance with claim 6 wherein the vial orienting resilient means are transparent fingers formed integrally with the second transparent sight member extending toward the first sight member.

9. A level in accordance with claim 6 wherein the securing means for securing the second sight member to the frame includes means rendering the second sight member angularly adjustable with relation to the frame to facilitate initial adjustment and readjustment of the angular orientation of the vial with respect to the work engaging surface of the frame.

10. A level in accordance with claim 6 wherein the vial is in the form of a toroidal segment and the vial orienting resilient means are pairs of transparent fingers formed integrally with the second transparent sight member, the fingers of each pair, unstressed, being spaced less than the diameter of the vial and being spread to resiliently clamp the vial and urge it toward the seat surface of the first transparent sight member.

References Cited in the file of this patent

UNITED STATES PATENTS

| | | |
|---|---|---|
| 786,269 | Curry | Apr. 4, 1905 |
| 813,561 | Leonhart | Feb. 27, 1906 |
| 1,777,429 | Charlton | Oct. 7, 1930 |
| 2,453,091 | Holloway et al. | Nov. 2, 1948 |
| 2,495,646 | Schultes et al. | Jan. 24, 1950 |
| 2,557,291 | Hubbard | June 19, 1051 |

FOREIGN PATENTS

| | | |
|---|---|---|
| 280,539 | Switzerland | May 1, 1952 |

OTHER REFERENCES

"Spirit Level," an article from "Modern Plastics," April 1945, pp. 122 and 123.